United States Patent [19]

Heisig et al.

[11] 4,023,646
[45] May 17, 1977

[54] LOAD SENSITIVE HYDRAULIC SYSTEM

[75] Inventors: Charles P. Heisig; John R. Plate, both of Milwaukee, Wis.

[73] Assignee: Allis-Chalmers Corporation, Milwaukee, Wis.

[22] Filed: Nov. 24, 1975

[21] Appl. No.: 634,875

[52] U.S. Cl. ................... 180/132; 60/422; 60/452

[51] Int. Cl.² .......................................... B62D 5/08

[58] Field of Search .............. 180/132, 141–163; 60/452, 450, 449, 422

[56] References Cited

UNITED STATES PATENTS

| | | | |
|---|---|---|---|
| 2,892,311 | 6/1959 | Van Gerpen | 60/450 X |
| 3,528,521 | 9/1970 | Ellis | 180/160 |
| 3,750,405 | 8/1973 | Lech et al. | 180/132 X |
| 3,915,253 | 10/1975 | Ott et al. | 180/155 X |

Primary Examiner—Joseph F. Peters, Jr.
Assistant Examiner—John A. Pekar
Attorney, Agent, or Firm—Arthur L. Nelson

[57] ABSTRACT

A load sensitive hydraulic system for operating auxiliary equipment on a vehicle with a priority flow control valve to provide priority pressure in operating a regenerative steering circuit of the hydraulic system. The regenerative hydraulic steering circuit provides load sensing and utilizes single source of pressurized fluid which responds to various loads in the hydraulic system. A priority valve assures that the steering demands are met before providing adequate pressure for all other auxiliary functions.

10 Claims, 9 Drawing Figures

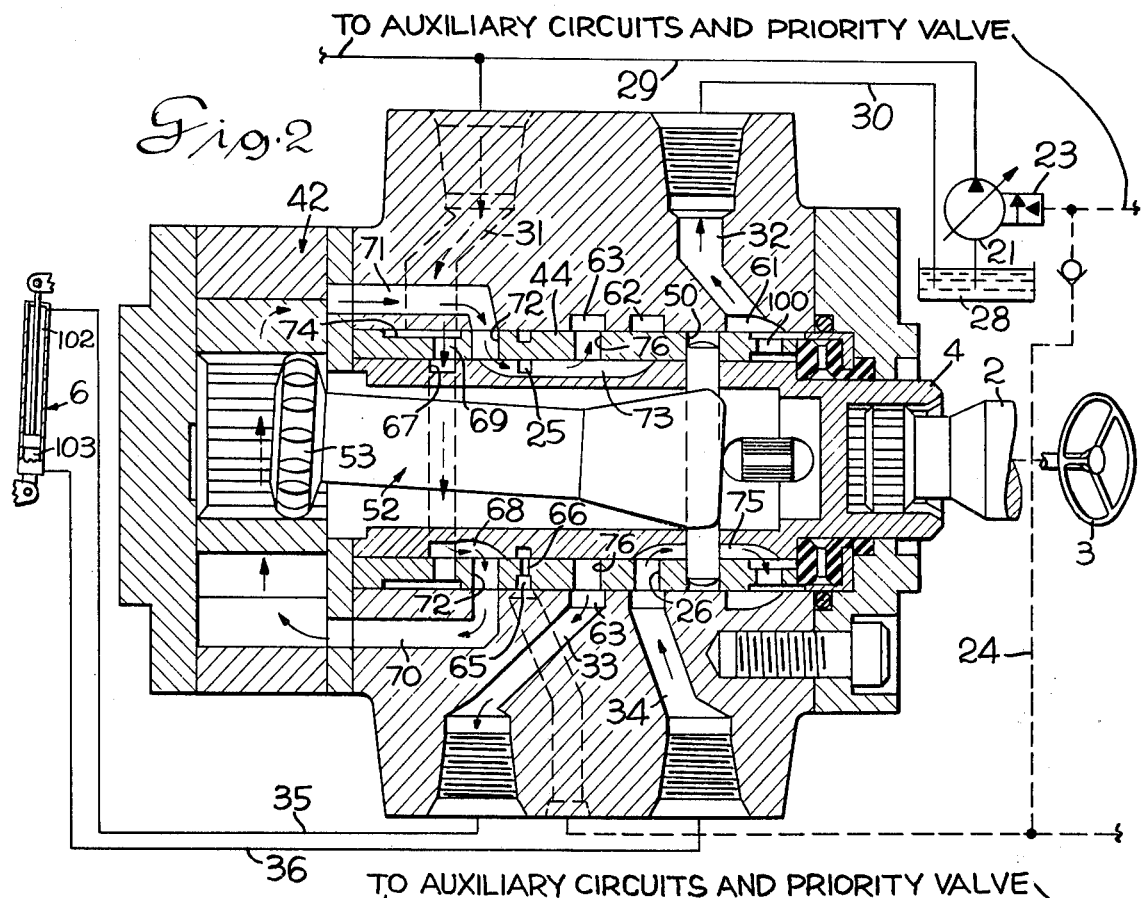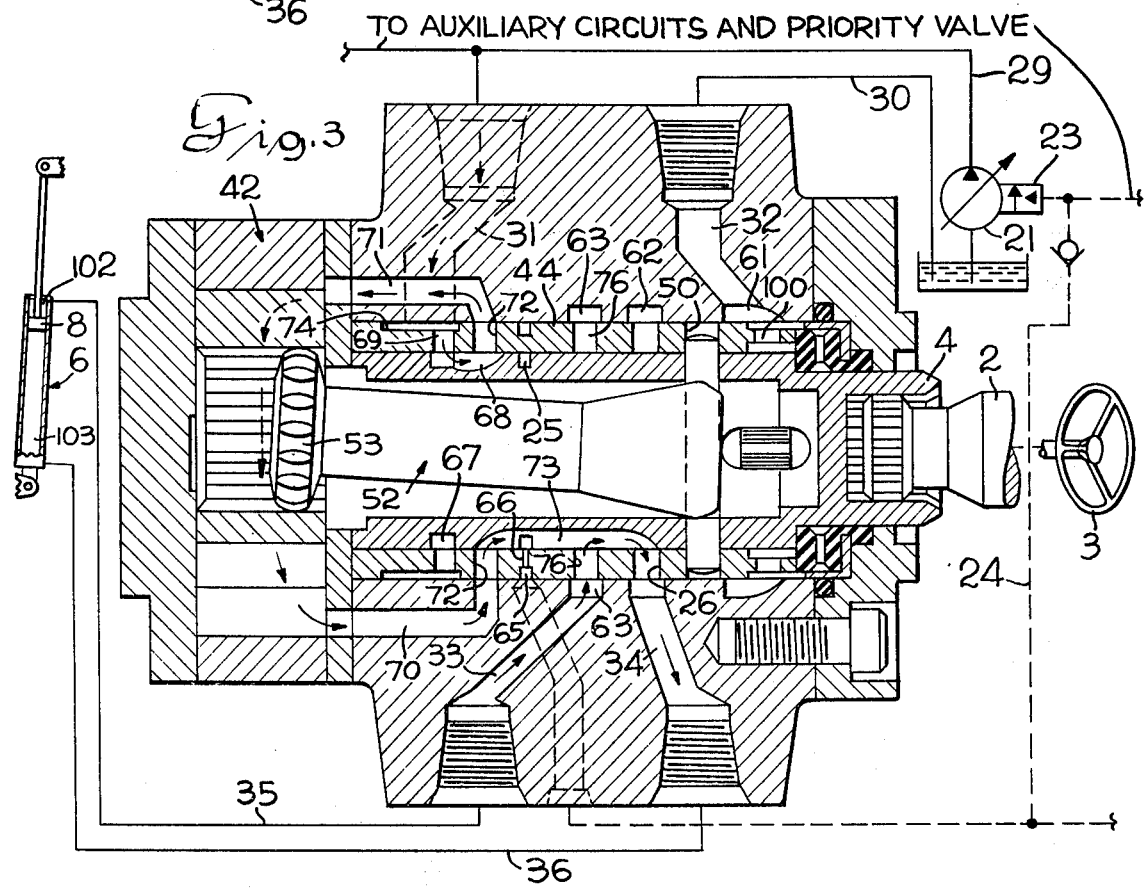

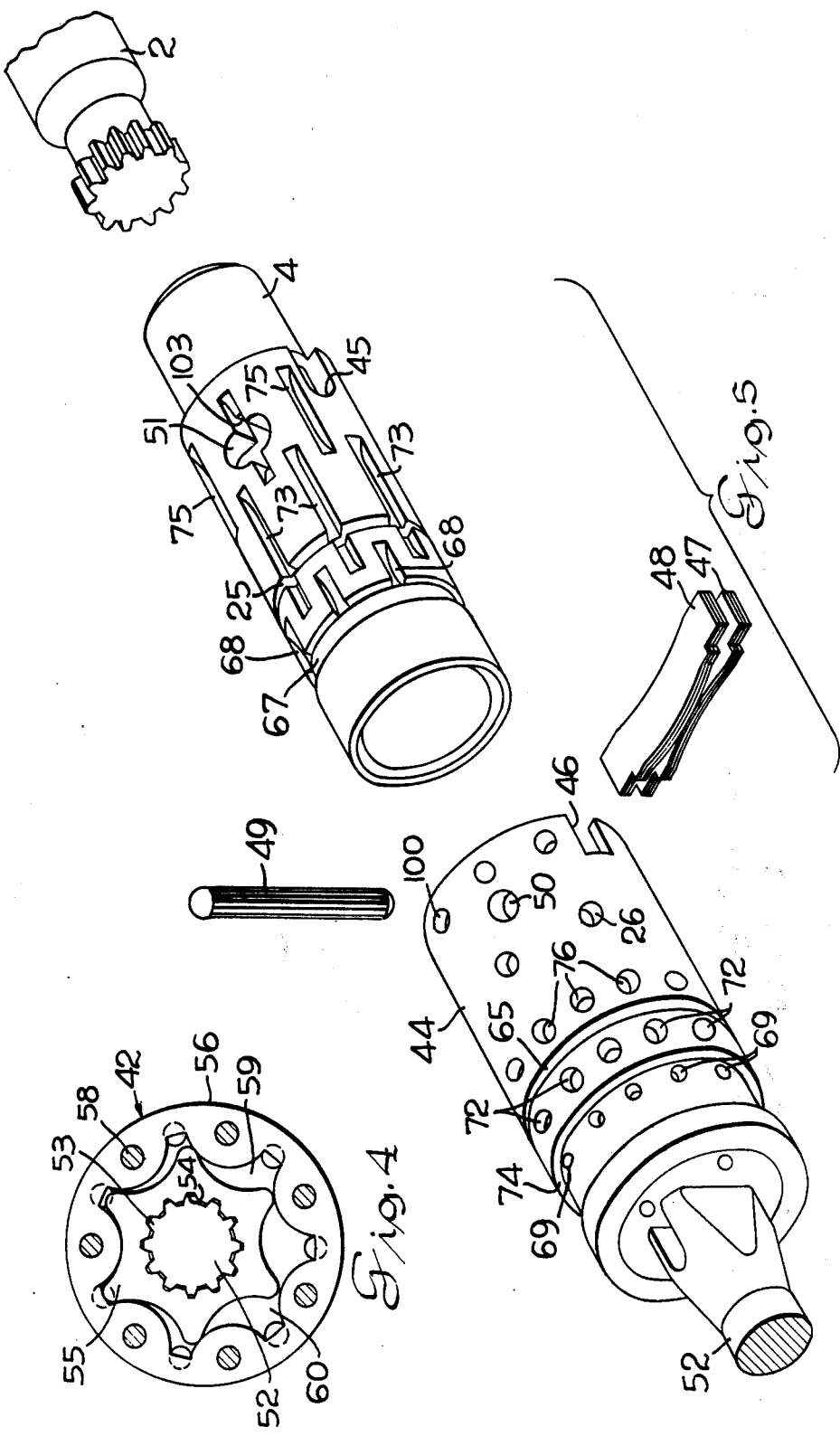

LOAD SENSITIVE HYDRAULIC SYSTEM

This invention relates to a hydraulic system and more particularly to a load sensitive hydraulic steering circuit in the hydraulic system supplying pressurized fluid for auxiliary operations with priority of flow to the steering circuit to assure control of the vehicle. A variable displacement pump senses load pressures in the various circuits including the steering circuit and provides displacement and pressure in the hydraulic system in accordance with the demand of the various load pressures sensed by the compensator of the hydraulic pump. Reference may be had to a copending patent application of the same inventor covering the steering circuit per se entitled Hydrostatic Load Sensitive Regenerative Steering System Ser. No. 634,892, filed Nov. 24, 1975.

The use of hydraulic systems to operate the various functions on a tractor is not only desirable but has become a necessity because of the increase in size of the modern tractors. A plurality of pumps have been used on conventional tractors because of the various pressure and volume requirements of the functions on the tractors. The pumps operating in this manner and particularly where the system is an open-center system require constant displacement at a standby pressure of each of the pumps to assure operation of each of the circuits when necessary with a consequent loss in efficiency. The closed-center system, however, has been used in some circuits whereby the pressure and displacement of the pump is varied in response to the load demands. Accordingly, this invention provides for a single source of pressurized fluid from which the various functions in the hydraulic system can be operated. It is apparent that a power steering circuit must always have adequate fluid pressure and volume available to assure control of the vehicle. Accordingly, this circuit provides for a load sensitive pump which varies the displacement of the pump and the standby pressure of the pump to assure a flow of pressurized fluid to the steering circuit through a priority valve. The compensator on the variable displacement pump senses load of the steering circuit as well as other circuits in the hydraulic system and maintains a predetermined pressure level above the sensed load pressures to assure operation of all circuits in the hydraulic system.

It is an object of this invention to provide a hydraulic system for operating auxiliary equipment in which a hydraulic steering circuit is operated through a priority valve. The circuits in the hydraulic system have pilot lines sensing load pressures applied to the compensator of the variable displacement pump to assure the flow of pressurized fluid for operation of all the circuits in the hydraulic system and reduce the displacement and pressure to a minimum when load requirements are minimal.

It is another object of this invention to provide a priority valve in a load sensitive hydraulic system to assure priority of flow of pressurized fluid to regenerative steering circuit and pilot line sensing load pressures to assure adequate volume and pressure of fluid in the system to maintain operation of all the circuits for operation of the auxiliary equipment.

It is a further object of this invention to provide a load sensing hydraulic system including a regenerative steering circuit and hydraulic circuits for auxiliary equipment with a priority valve to assure adequate pressure and fluid displacement for operating the steering circuit.

It is a further object of this invention to provide a hydraulic regenerative steering circuit and auxiliary steering circuits with the load sensing through pilot lines for operating the compensator of the variable displacement pump to provide priority flow to the steering circuit and adequate flow and pressure to all of the circuits in the hydraulic system.

The objects of this invention are accomplished by providing a variable displacement pump with a compensator sensing load pressure in the various circuits in the hydraulic system to vary the displacement and pressure of the pump in accordance with load requirements. The hydraulic system includes a hydraulic regenerative steering circuit and hydraulic auxiliary circuits for operating various auxiliary operations on the vehicle. A priority valve in the hydraulic system assures priority of flow of pressurized fluid to the regenerative steering circuit to maintain steering control. The steering circuit is a regenerative circuit operated through a hydraulic steering control valve in which the steering load is sensed and through a pilot line applied to the compensator of the variable displacement pump to assure standby pressure and displacement of hydraulic fluid to assure operation of the steering circuit.

Referring to the drawings, the preferred embodiment of this invention is illustrated.

FIG. 2 is a cross section view of the steering control valve in right turn position with a schematic of the hydraulic circuit.

FIG. 3 is a cross section view of the steering control valve in the left turn mode and a portion of the schematic diagram for the hydraulic system.

FIG. 4 is a cross section view taken on line IV—IV of FIG. 1.

FIG. 5 is an exploded view of the main parts of the hydraulic steering control valve.

Figure 1:
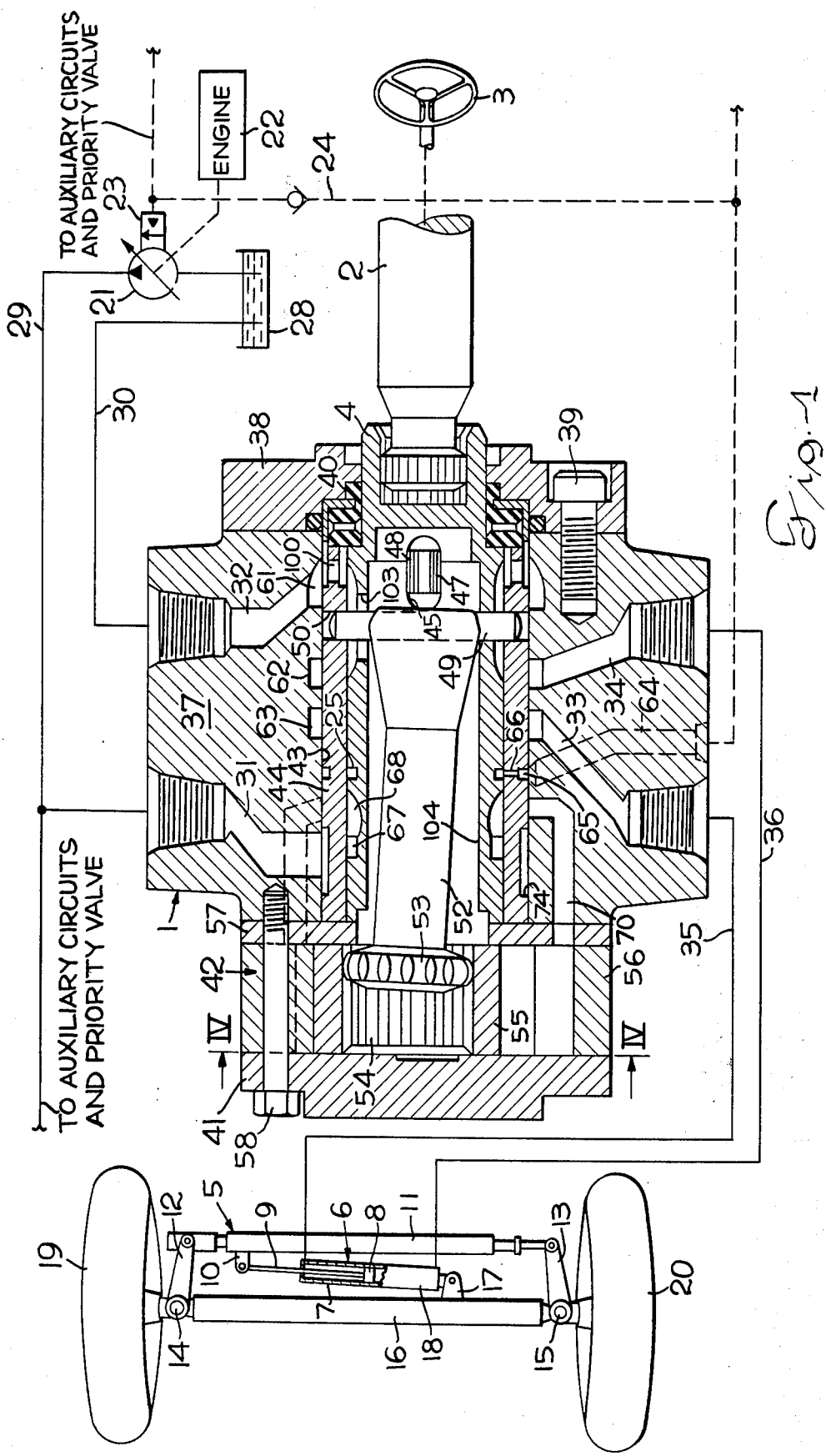
FIG. 1 illustrates a schematic drawing of the hydraulic system with a cross section view of the steering control valve in neutral position.

Referring to the drawings, the preferred embodiment of this invention is illustrated. The load pressure is sensed in the control valve as the pressurized fluid is applied to the hydraulic actuator for steering the vehicle.

FIG. 1 illustrates the steering control valve 1 operated by the input shaft 2 connected to the steering wheel 3. The input shaft 2 is connected to the commutator sleeve 4 by a spline connection between the shaft 2 and sleeve 4.

A control valve 1 controls a steering mechanism 5 which includes the hydraulic actuator 6. The hydraulic actuator 6 includes the cylinder 7 receiving a piston 8 connected to a rod 9. The rod 9 has a cross-sectional area equal to one-half the cross-sectional area of the piston 8. The rod 9 is connected to the bracket 10 mounted on the tie rod 11. The tie rod 11 is connected between the steering arms 12 and 13 on the king pins 14 and 15, respectively. The front axle 16 supports the bracket 17 which carries the base end 18 of the hydraulic actuator 6. The front wheels 19 and 20 are steered by the steering linkage 5.

The hydraulic pump 21 is driven by the engine 22. The hydraulic pump 21 is a variable displacement pump with a compensator 23 mounted on the pump operating in response to pressure sensed in the control valve by the pilot line 24. The pilot line 24 senses the load pressure in the valve 1. The compensator 23 is a conventional stroking and destroking mechanism responsive to sensed pressure by the pilot line. The pump 21 displaces pressurizes fluid to the high pressure line 29. The pump 21 receives supply fluid from the reservoir 28. The reservoir line 30 returns fluid from the valve to the reservoir 28.

The control valve 1 forms a high pressure chamber passage 31 and a reservoir passage 32. The hydraulic actuator 6 is connected through the hydraulic actuator passage 33 and the hydraulic actuator passage 34. The hydraulic actuator passage 33 supplies fluid to the hydraulic actuator 6 through the conduit 35. The hydraulic actuator passage 34 supplies hydraulic fluid to the hydraulic actuator 6 through the conduit 36.

The valve housing 37 includes an end plate 38 which is fastened to the housing 37 by a plurality of bolts 39 of which one is shown. The end plate 38 supports the commutator sleeve 4 which embraces the seal 40 which encircles the commutator sleeve. The end plate 41 is fastened on the left-hand of the housing 37 and encloses the metering unit 42.

The housing 37 is formed with a central opening 43 which receives the valve sleeve 44. The valve sleeve 44 receives the commutator sleeve 4. The commutator sleeve 4 is provided with a slot 45 in its end which adjoins the slot 46 in the valve sleeve 44. A pair of laminated springs 47 and 48 extend radially through the slots 45 and 46 and transmits a rotating force from commutator sleeve 4 to the valve sleeve 44 as the input shaft is rotated. The resilience of the pair of springs 47 and 48 allow angular displacement of the commutator sleeve 4 relative to the valve sleeve 44.

The pin 49 extends through a diametrical opening 50 in the valve sleeve 44. The pin 49 also extends through the elongated diametrical opening 51 of the commutator sleeve 4 which allows for the maximum angular displacement of the sleeves during the operation. The wobble shaft 52 has a bifurcated end which receives the pin 49. The wobble shaft 52 is formed with a gear 53 on the opposite end which is received in the splined opening 54 in the star wheel 55 of the metering unit 42. The star wheel 55 rotates within the stator 56 which is mounted between the end plate 41 and the spacer 57 on the housing 37.

FIG. 4 shows a cross-section view showing the stator 56 and the plurality of bolts 58 fastening the end plate 41, a stator 56 and the spacer 57 on the housing 37 of the valve. The star wheel 55 rotates within the stator 56 to meter the fluid as it flows into the expanding chamber 59 while it is flowing out of the contracting chamber 60 and vice versa as the star wheel 55 rotates within the stator 56. This provides a metering of the fluid as its flows through the valve.

The housing 37 is formed with annular recess 61 in communication with the return passage 32. The annular recess 62 is in communication with a hydraulic passage 34 while the annular recess 63 in the housing 37 is in communication with the hydraulic actuator passage 33. Similarly, the annular recess 74 in the sleeve 44 is in communication with the high pressure inlet passage 31 from the pump 21.

The pilot passage 64 is in communication with the annular recess 65 in the valve sleeve 44. The vent 66 extends through the valve sleeve 44 for selectively sensing load pressures in the annular groove 25 communicating with the hydraulic passages 73 connected to the actuator 6 when the vehicle is steering in either the right or left position.

The commutator sleeve 4 is formed with an annular groove 67 in its outer periphery. The annular groove 67 is also in communication with the axial slots 68 which are in communication with a high pressure passage 31 through ports 69 in valve sleeve 44. High pressure fluid coming in the inlet passage 31 flows through the annular recess 74 and ports 69 through passages 70 or 71 to the metering unit. The fluid returns through the outlet metering passage 71 or 70 to the port 72 in the valve sleeve 44. An axial slot 73 is in communication with the port 72 which receives the high pressure fluid from the metering unit 42. The annular recess 63 in the housing receives pressurized fluid from the port 76 and the slot 73. The hydraulic actuator passage 33 is in communication with the commutator slot 73 in left or right-turn position. In the regenerative position or left-turn position shown in FIG. 3 slot 73 is in communication through port 26 to actuator passage 34. Hydraulic fluid is returned to the reservoir from the hydraulic actuator 6 through passage 34 and return passage 32 in the right-turn position as shown in FIG. 2.

FIG. 2 shows the right-turn position in which the pressurized fluid is supplied to the hydraulic actuator passage 33 to the rod end of the hydraulic actuator 6. Hydraulic fluid from the base end at the hydraulic actuator 6 is returned through passage 34. Hydraulic fluid returns through the passage 34 and goes into the port 26 in the valve sleeve 44 and into the axial commutator slot 75 in the commutator sleeve and through port 100 is valve sleeve 44 and the annular recess 61 to return passage 32.

Figure 6:
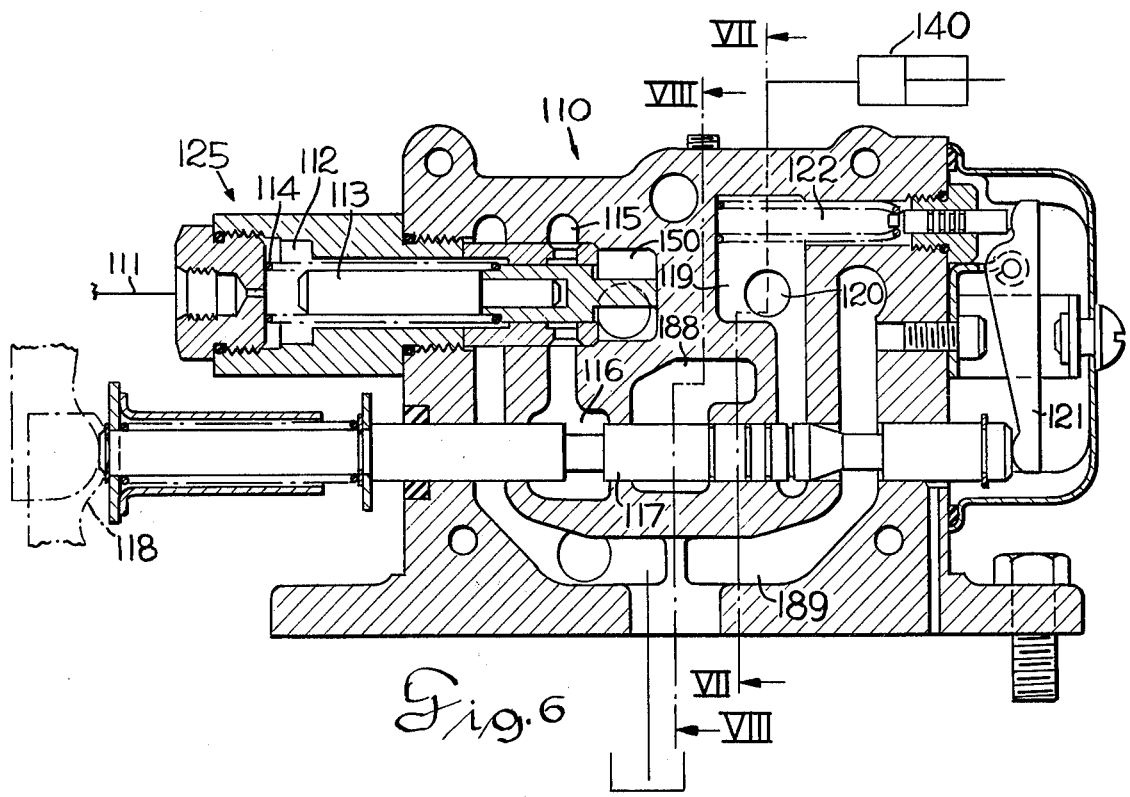
FIG. 6 is a cross section view of the priority control valve and a draft control valve.

FIG. 6 illustrates a draft control valve 110 with a conduit 111 connected to the chamber 112. The plunger 113 is biased in the right-hand position by the spring 114. Pressurized fluid in the pump chamber 150 normally biases the plunger 113 in a left-hand direction to provide communication between a pump pressure chamber 150 and the passage 115. The passage 115 is connected to a chamber 116 which is selectively opened and closed by the spool 117 in response to draft load requirements. The spool 117 is operated by draft load sensing mechanism operated in response to draft load as indicated at 118. The spool 117 selectively opens and closes the chamber 116 to the hydraulic actuator chamber 188 which in turn is in communication with the passage 119 connected to the actuator port 120 shown in FIG. 7, which is connected to hydraulic actuators. The flow of pressurized fluid to the hydraulic actuators is conditioned by movement of the reaction lever 121 responsive to pressurized fluid in pressure chamber 122.

Figure 7:
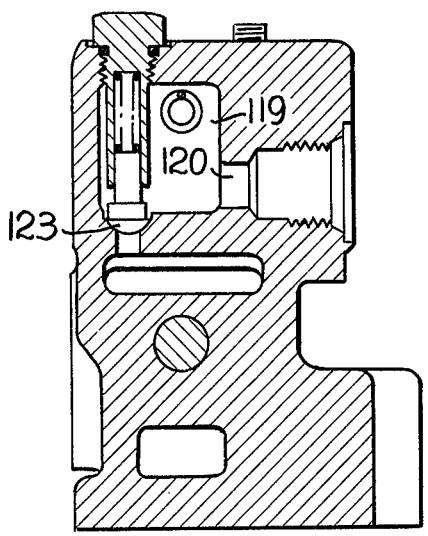
FIG. 7 is a cross section view taken on line VII—VII of FIG. 6.
Figure 8:
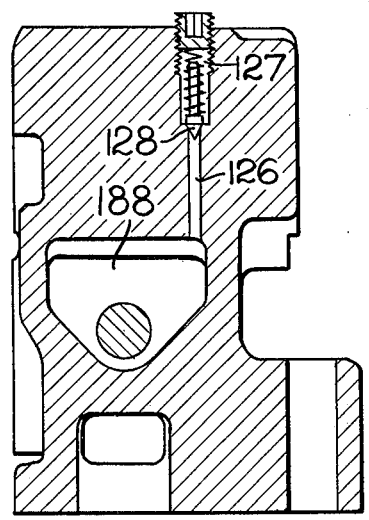
FIG. 8 is a cross section view taken on line VIII—VIII of FIG. 6.

When the force from the load sensing linkage 118 is relieved, pressure in the chamber 122 is sufficient to move lever 121 and the spool in the left-hand direction and the pressurized fluid in chamber 119 is relieved through the sump chamber 189. FIGS. 7 and 8 show the connections of the chamber 188 to the chamber 119 through the check valve 123.

Figure 9:
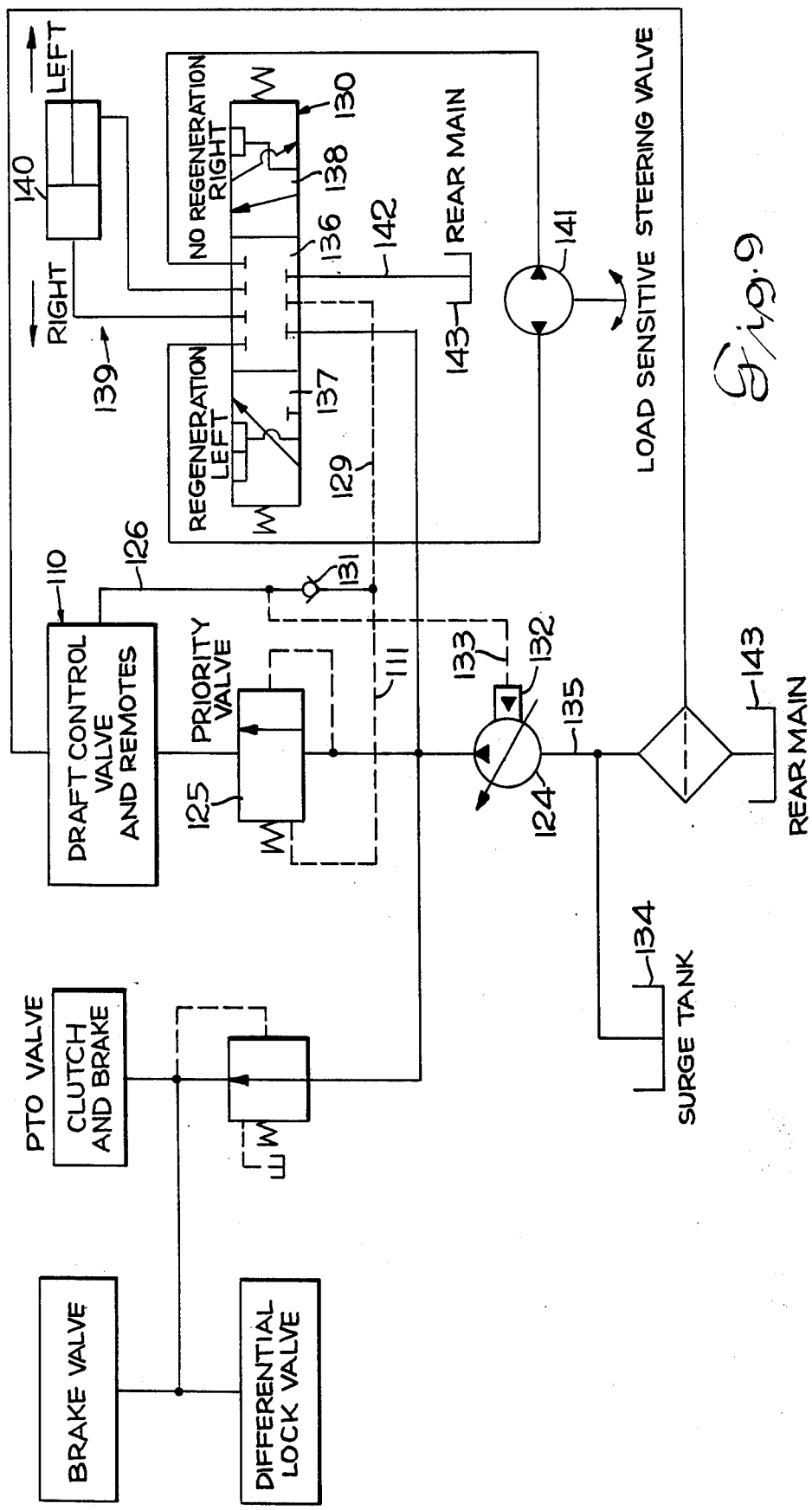
FIG. 9 is a schematic illustration of the hydraulic system including the draft control valve and auxiliary circuits and the priority valve as well as the regenerative hydraulic steering circuit in the hydraulic system.

FIG. 9 shows the hydraulic system schematically. The draft control valve 110 is connected to the pump 124 through the priority valve 125. The priority valve 125 is shown in the upper left-hand corner of the draft control valve 110 of FIG. 6. The variable displacement pump senses pressure in the draft control valve 110 in the chamber 188 through the pilot line 126 connected to the port 127 as shown in FIG. 8. A check valve 128 isolates the control valve sensing pressure from the line 126 when the valve is closed.

Similarly, the pilot line 129 transmits load pressure from the steering control valve 130. The pilot line check valve 131 closes and interrupts communication from conduit 111 and pilot line 129 to pilot line 126 when there is a higher pressure in pilot line 126. The pilot line 126 and 129 apply the sensed load pressures to the compensator 132 through the line 133. The variable displacement pump 124 receives pressurized fluid from the reservoir 134 through the conduit 135. The hydraulic steering control valve 130 is the same as previously described in this application and the three positions for the valve are shown. Neutral section 136 is shown in the intermediate portion of the valve while the left-turn section 137 is shown on the left-hand side while the right-hand section 138 is shown on the right-hand side.

The hydraulic circuit 139 is a regenerative circuit in the left-turn position. The hydraulic steering circuit operates the hydraulic actuator 140 to steer the vehicle in the left-hand direction and provides balanced steering. The hydraulic steering control valve includes a metering unit 141 which meters the fluid as it flows through the hydraulic steering control valve 130 and to the hydraulic actuator 140. The hydraulic fluid from the hydraulic actuator 140 is returned through the drain passage 142 to the reservoir 143.

Remote hydraulic circuits may be provided which sense load pressures in the remote hydraulic valve which controls the flow of pressurized fluid from the pump to the hydrauic actuator to operate the hydraulic function in the particular hydraulic circuit involved. The pressurized fluid from the remote hydraulic circuits and the draft control valve is returned to the reservoir 134 or 143 to the charging side of pump 124.

The operation of the hydraulic system will be described in the following paragraphs.

The hydraulic system shown in FIG. 9 includes the draft control valve and priority valve shown in FIG. 6, together with other auxiliary circuits. Pressurized fluid from the pump 124 passes through the priority control valve 125 to the draft load control valve 110. Pressurized fluid from the pump output passes directly to the steering control valve 130. The steering control valve 130 is connected to the priority valve 125 through a pilot line 111 which senses load pressure in the steering valve 130. The priority valve closes the flow of pressurized fluid to the draft control valve 110 when the pressure in the chamber 112 is sufficient to bias the plunger 113 to the right-hand position. Communication between the high pressure chamber 150 and the chamber 115 is interrupted. The pressure in the chamber 112 is the load pressure sensed in the steering control valve. When the pressure in the chamber 150 which is the pump output pressure is sufficient to overcome the pressure in the chamber 112, the spool is biased in the left-hand direction and pressurized fluid from the pump 124 is supplied to the draft control valve 110. Pressurized fluid in the chamber 115 is then supplied to the chamber 188 and chamber 119 and to the hydraulic actuator 140. The interaction between the draft control linkage 118 and the reaction lever 121 controls the fluid flow to the hydraulic actuator 140 to control the hydraulic draft control system on the tractor.

Conversely, when the pressure sensed in the steering control valve 130 increases the pressure in the chamber 112 also increases biasing the plunger 113 in the right-hand direction and interrupting communication between the high pressure chamber 150 and the chamber 115. This interrupts communication between the pump 124 and the draft control valve 110 and assures that pressurized fluid is supplied to the steering control valve 130. The pump 124 senses the highest load pressure to operate all functions. A circuit is provided for the PTO clutch and to provide priority of pressurized fluid to the brake circuit to assure power brakes when necessary for control of the vehicle.

The embodiments of the invention in which an exclusive property or privilege is claimed are defined as follows:

1. A hydraulic system including a regenerative balanced hydraulic steering circuit and auxiliary circuits operating from a variable displacement pump having a compensator sensing load pressures to control the pump displacement to meet the load requirements of the hydraulic system including, a steering control valve including, a housing, an input shaft adapted for connection to the steering wheel, a metering unit in said steering control valve for metering the flow of pressurized fluid through said control valve to provide proportionate fluid flow through the valve responsive to the angular rotational movement of said input shaft, a hydraulic actuator for connection to a steering linkage for steering a motor vehicle, said hydraulic actuator defining rod end hydraulic chamber and a base end hydraulic chamber, conduit means between said steering control valve and said hydraulic actuator to operate said steering linkage in response to fluid flow through said steering control valve, a commutator sleeve connected to said input shaft, a valve sleeve received in said valve housing and receiving said commutator sleeve defining passageways for selectively transmitting pressurized fluid through said steering valve and metering unit for regenerative operation of said hydraulic steering circuit in one direction and nonregenerative steering in the other direction, a variable displacement pump, said commutator sleeve and said valve sleeve defining a sensing passage in communication with said passageways when said variable displacement pump is connected to said hydraulic actuator through said steering control valve, a compensator on said variable displacement pump to vary the displacement of said pump responsive to load pressures sensed by said compensator, a pilot line connecting said sensing passage in said steering control valve to said compensator for sensing a load signal for controlling the displacement of said pump responsive to load requirements in said hydraulic steering circuit, auxiliary circuits including an auxiliary control valve for controlling the flow to fluid to hydraulic actuators in said auxiliary circuits, a priority control valve connected to the output of said variable displacement pump to provide priority of flow to said steering circuit, an auxiliary pilot line sensing load requirement in said auxiliary circuit connected to said compensator to vary the displacement of said pump responsive to load demands in said auxiliary circuit, conduit means connecting said pilot line connected to said steering control valve to said priority valve for controlling the priority flow to said steering circuit responsive to load requirements in said steering circuit, check valve means connecting said pilot line connected to said steering control valve to said auxiliary pilot line and preventing auxiliary load pressures from controlling the priority valve.

2. A hydraulic system including a regenerative balanced hydraulic steering circuit and auxiliary circuits operating from a variable displacement pump having a compensator sensing load requirements to control the pump displacement to meet the requirements of the hydraulic system as set forth in claim 1 including means connecting the steering control valve pilot line through said steering control valve adjacent said conduit means between said steering control valve and said hydraulic actuator for sensing load pressure in said steering hydraulic actuator to operate said priority valve.

3. A hydraulic system including a regenerative balanced hydraulic steering circuit and auxiliary circuits operating from a variable displacement pump having a compensator sensing load pressures to control the pump displacement to meet the requirements of the hydraulic system as set forth in claim 1 including a hydraulic draft control system including a control valve adapted for operating in said auxiliary hydraulic circuit.

4. A hydraulic system including a regenerative balanced hydraulic steering circuit and auxiliary circuits operating from a variable displacement pump having compensator sensing load pressures to control the pump displacement to meet load requirements of said hydraulic system as set forth in claim 1 wherein said hydraulic actuator in said hydraulic steering circuit including a piston and a rod connected to said piston, the base end of said cylinder defining the base end chamber, said base end chamber having essentially twice the cross-sectional area of the cross-sectional area of the rod end chamber to provide balanced steering, said hydraulic steering valve providing regenerative steering circuit when said circuit is steering said vehicle in one direction.

5. A hydraulic system including a regenerative balanced hydraulic steering circuit and auxiliary circuits operating from a variable displacement pump having a compensator sensing load pressures to control the pump displacement to meet the load requirements of the hydraulic system as set forth in claim 1 including, a draft control valve means supporting said priority valve and said draft control valve in a single housing.

6. A hydraulic system including a regenerative balanced hydraulic steering circuit and auxiliary circuits operating from a variable displacement pump having a compensator for sensing load pressures to control the pump displacement to meet the load requirements of said hydraulic system as set forth in claim 1 including a hydraulic brake circuit connected in said hydraulic system, means providing priority of flow of pressurized fluid to said brake circuit and, said hydraulic steering system.

7. A hydraulic system including a regenerative balanced hydraulic steering circuit and auxiliary hydraulic circuits operating from a variable displacement pump having a compensator sensing load pressures to control the pump displacement to meet the load requirements of said hydraulic system as set forth in claim 1 wherein said priority valve senses a load pressure in said steering control valve and a hydraulic chamber in said priority valve sensing pump output pressures for controlling the flow of pressurized fluid to said auxiliary hydraulic circuits.

8. A hydraulic system including a regenerative balanced hydraulic steering circuit and auxiliary circuits operating from a variable displacement pump having a compensator sensing load pressures to control the pump displacement to meet the load requirements of said hydraulic system as set forth in claim 1 comprising a draft control valve including said priority valve defining a cylindrical opening, a plunger operating said priority valve reciprocally mounted in said cylindrical opening defining a load pressure chamber connected to said hydraulic steering control valve, means defining a high pressure chamber in said cylindrical opening connected through said draft control valve to the pump output, said priority valve thereby controlling the flow of pressurized fluid from said pump to an auxiliary circuit through said draft control valve in response to load pressures in said steering valve.

9. A hydraulic system including a regenerative balanced hydraulic steering circuit and auxiliary circuits operating from a variable displacement pump having a compensator sensing load pressures to control the pump displacement to meet the load requirements of said hydraulic system as set forth in claim 1 wherein said steering control valve sleeves define a rotary valve wherein said commutator sleeve controls the flow of pressurized fluid through said valve to said steering hydraulic actuator.

10. A hydraulic system including a regenerative balanced hydraulic steering circuit and auxiliary circuits operating from a variable displacement pump having a compensator sensing load pressures to control the pump displacement to meet the load requirements of the hydraulic system as set forth in claim 1 including said sensing passage defining an annular groove in said hydraulic steering valve for controlling the displacement of said variable displacement pump.

* * * * *